US011692678B1

(12) United States Patent
Jenkins et al.

(10) Patent No.: US 11,692,678 B1
(45) Date of Patent: Jul. 4, 2023

(54) POLYMERIC MATERIALS FOR USE WITH HIGH POWER INDUSTRIAL LUMINAIRES

(71) Applicant: Dialight Corporation, Farmingdale, NJ (US)

(72) Inventors: Kenneth Jenkins, Farmingdale, NJ (US); Samual Boege, Farmingdale, NJ (US); Jason DiPasquale, Farmingdale, NJ (US); Anthony Verdes, Farmingdale, NJ (US)

(73) Assignee: Dialight Corporation, Farmingdale, NJ (US)

( * ) Notice: Subject to any disclaimer, the term of this patent is extended or adjusted under 35 U.S.C. 154(b) by 0 days.

(21) Appl. No.: 17/683,456

(22) Filed: Mar. 1, 2022

(51) Int. Cl.
| | |
|---|---|
| *F21K 9/235* | (2016.01) |
| *C08J 3/00* | (2006.01) |
| *F21V 23/00* | (2015.01) |
| *F21K 9/69* | (2016.01) |
| *F21V 25/12* | (2006.01) |
| *F21Y 115/10* | (2016.01) |

(52) U.S. Cl.
CPC ............ *F21K 9/235* (2016.08); *C08J 3/005* (2013.01); *F21K 9/69* (2016.08); *F21V 23/005* (2013.01); *F21V 25/12* (2013.01); *C08J 2301/12* (2013.01); *C08J 2303/02* (2013.01); *C08J 2367/04* (2013.01); *F21Y 2115/10* (2016.08)

(58) Field of Classification Search
CPC ... F21K 9/235; F21K 9/69; C08J 3/005; C08J 2301/12; C08J 2303/02; C08J 2367/04; F21V 23/005; F21V 25/12; F21Y 2115/10
See application file for complete search history.

(56) References Cited

U.S. PATENT DOCUMENTS

| | | | |
|---|---|---|---|
| 2004/0192849 A1* | 9/2004 | Gaukroger | C08L 27/06 525/228 |
| 2020/0363027 A1* | 11/2020 | Cattoni | F21V 29/76 |
| 2021/0031995 A1* | 2/2021 | Benson | B65D 63/1018 |
| 2021/0242380 A1* | 8/2021 | Kim | H01L 25/0753 |

FOREIGN PATENT DOCUMENTS

| | | | |
|---|---|---|---|
| CN | 104017311 A | * | 9/2014 |
| JP | H07304883 A | * | 11/1995 |
| JP | H1086212 A | * | 4/1998 |
| JP | 2007302776 A | * | 11/2007 |
| JP | 2009-113375 | * | 5/2009 |
| JP | 2010153091 A | * | 7/2010 |
| JP | 2017521859 A | * | 8/2017 |

(Continued)

OTHER PUBLICATIONS

Machine English Translation of WO-2019208880-A1; Cho H; Oct. 2019.*

(Continued)

*Primary Examiner* — Jong-Suk (James) Lee
*Assistant Examiner* — Glenn Zimmerman
(74) *Attorney, Agent, or Firm* — Tong, Rea, Bentley & Kim, LLC

(57) ABSTRACT

The present disclosure is directed to examples of housing for a luminaire. In one example, the housing includes a bioplastic base formed to receive a light emitting diode and a driver and a lens coupled to the bioplastic base. The bioplastic base may include a bioplastic and is formed with a non-biodegradable or a biodegradable plastic.

14 Claims, 2 Drawing Sheets

(56) References Cited

FOREIGN PATENT DOCUMENTS

| | | | | |
|---|---|---|---|---|
| KR | 102187150 B1 | * | 1/2021 | |
| WO | WO-2012043219 A1 | * | 4/2012 | ............... C08L 69/00 |
| WO | WO-2013148276 A1 | * | 10/2013 | ............... F21K 9/56 |
| WO | WO-2017218108 A1 | * | 12/2017 | ............... F21K 9/23 |
| WO | WO-2019208880 A1 | * | 10/2019 | ......... H01L 25/0753 |
| WO | WO-2021231435 A1 | * | 11/2021 | |

OTHER PUBLICATIONS

Machine English Translation of WO-2012043219-A1; Kumazawa; Nov. 2007.*
Machine English Translation of KR102187150; Jan. 2021.*
https://en.wikipedia.org/wiki/Polyvinyl_alcohol; Wikipedia encyclopedia article; No author (Year: 2022).*
English Translation of JPH07304883A; 1101995; Aoki et al. (Year: 1995).*
Polyvinyl Alcohol; https://en.wikipedia.org/wiki/Polyvinyl_alcohol (Year: 2022).*
English Translation; JP 2017521859 A; Aug. 3, 2017; プレバット, カール (Year: 2017).*
English Translation of JPH1086212A; JP; 1998; Ito.*
English Translation of JP2007302776A; Suzuki; 2007.*
English Translation of CN104017311A; Li; 2014.*
English Translation of JP2009113375; Kazusawa etal; 2009.*

* cited by examiner

US 11,692,678 B1

POLYMERIC MATERIALS FOR USE WITH HIGH POWER INDUSTRIAL LUMINAIRES

BACKGROUND

Luminaires can be used to illuminate an area. Luminaires can include various types of light sources such as incandescent or light emitting diodes (LEDs). Currently, LEDs are preferred due to lower energy usage and the ability to provide sufficient light output.

LED based luminaires are being deployed more for residential and commercial use. In certain applications, a large number of LEDs may be used to illuminate large areas, buildings, or warehouses. The large LED based luminaires may have relatively large housings and components to accommodate the number of LEDs and/or LED arrays to generate a sufficient amount of light.

SUMMARY

In one embodiment, the present disclosure provides a housing for a luminaire. In one embodiment, the housing comprises a bioplastic base formed to receive a light emitting diode and a driver and a lens coupled to the bioplastic base. The bioplastic base may include a bioplastic and is formed to be non-biodegradable or biodegradable.

In one embodiment, the present disclosure provides a luminaire. The luminaire comprises at least one light emitting diode (LED), a driver to power the at least one LED, a bioplastic base to receive the at least one LED and the driver, and a lens coupled to the bioplastic base such that the at least one LED and the driver are enclosed by the bioplastic base and the lens.

In one embodiment, the present disclosure provides a method for forming a luminaire housing. The method comprises providing a bioplastic comprising at least one of: cellulose acetate, polylactic acid, polyhydroxyalkanoates, or thermoplastic starches, adding an impact modifier to the bioplastic to create a mixture that comprises at least 50% of a mass of the bioplastic, and curing the mixture into a desired shape to form a bioplastic base to receive a light emitting diode and a driver.

BRIEF DESCRIPTION OF THE DRAWINGS

So that the manner in which the above recited features of the present disclosure can be understood in detail, a more particular description of the disclosure, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

The present disclosure provides LED luminaire housings that are fabricated from polymeric materials. As noted above, LED based luminaires are being deployed more for residential and commercial use. In certain applications, a large number of LEDs may be used to illuminate large areas, buildings, or warehouses. The large LED based luminaires may have relatively large housings and components to accommodate the number of LEDs and/or LED arrays to generate a sufficient amount of light. In residential applications, LED luminaires may be frequently replaced or thrown away.

In some instances, the LEDs may generate a large amount of heat, and the luminaires may be exposed to harsh environmental conditions. Thus, sturdy plastic and/or heavy metal housings are typically used to enclose the LEDs in the luminaires and to withstand these harsh environmental conditions. These sturdy plastics may not degrade over time. Thus, in certain residential uses where LED luminaires may be frequently disposed of, the plastic or metal housings of the LED luminaires may not be the most environmentally friendly solution because these housings are not readily biodegradable.

The present disclosure provides an LED luminaire housing that uses a bioplastic that is designed to be suitable for LED luminaires. For example, the bioplastic can provide sufficient strength to enclose the LEDs, to withstand certain environmental conditions where the luminaires may be deployed, to withstand the heat generated by the LEDs, and to be safe for the environment. The bioplastic can be non-biodegradable or biodegradable.

Figure 1:
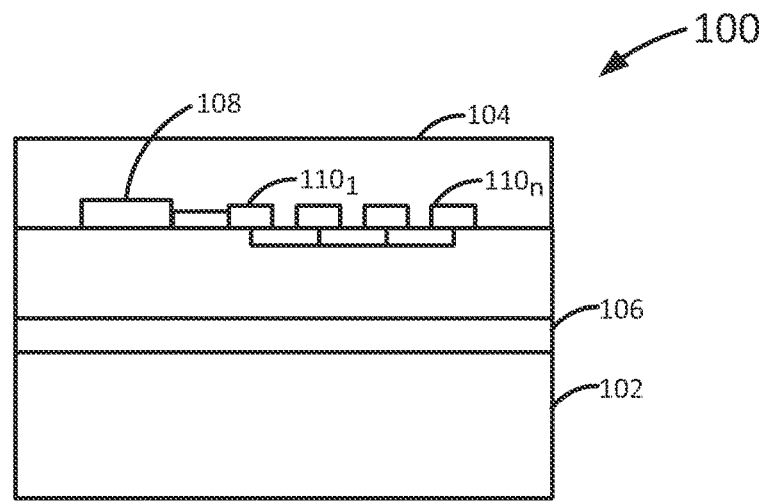
FIG. 1 depicts an example block diagram of one embodiment of a luminaire with a bioplastic base of the present disclosure.

FIG. 1 illustrates an example luminaire 100 of the present disclosure. In one embodiment, the luminaire 100 may be a high powered, high lumen light source (e.g., greater than 100 lumens) for commercial/industrial applications or may be a low powered light source for residential applications (e.g., less than 100 lumens). In one embodiment, the luminaire 100 may include a housing or bioplastic base 102 and an outer lens or optic 104. The bioplastic base 102 may receive a substrate 106 that includes a driver 108 and one or more light emitting diodes (LEDs) 110$_1$ to 110$_n$ (hereinafter also referred to individually as an LED 110 or collectively as LEDs 110).

In one embodiment, the substrate 106 may be a printed circuit board (PCB). The substrate 106 may include metallic contacts and circuit lines to electrically connect the LEDs 110 to the driver 108, as well as other electrical components within the luminaire 100.

The bioplastic base 102 and the lens 104 may enclose the substrate 106, the driver 108, and the LEDs 110, as well as additional components that are not shown. For example, the bioplastic base 102 and the lens 104 may enclose a power supply, reflectors, heat sinks, wireless transmitter/receivers, other electrical components, and the like.

In one embodiment, the bioplastic base 102 may be fabricated from a non-biodegradable plastic or a biodegradable plastic. For example, the bioplastic base 102 may be fabricated from a material that can reduce the environmental footprint or impact of the luminaire 100.

The non-biodegradable or biodegradable plastic may be modified to provide sufficient structural integrity and/or strength to support the weight of the components received by the bioplastic base 102. The non-biodegradable or biodegradable plastic may also be modified to withstand some environmental conditions to protect the internal components (e.g., protect against wind, water, dust, and the like) and to withstand relatively high temperatures caused by heat generated by the LEDs.

In one embodiment, the bioplastic may be fabricated from reclaimed content, waste content, or renewable content. In one embodiment, renewable content may include bioplastics made with food crops or plants such as corn or sugar cane. In one embodiment, waste content may include bioplastics made with used or end of life materials like cooking oil. In one embodiment, recycled content may include bioplastics that are made with polymer materials that are obtained from either mechanical shredded or chemical recycling.

In one embodiment, the bioplastic may include at least one of: cellulose based bioplastics (e.g., cellulose acetate), polylactic acid, polyhydroxyalkanoates, thermoplastic starches, and the like. Said another way, the biodegradable plastic may exclude fossil based plastics such as polyvinyl chloride, polyethylene, polyvinyl acetate, and the like. Moreover, the biodegradable plastic may exclude bioplastics that are not biodegradable.

In one embodiment, the bioplastic base 102 may include a mixture with other additives to help the performance and improve the characteristics of the bioplastic base 102. However, the mixture may include at least 50% or more of a mass of the biodegradable plastic to ensure that the bioplastic base 102 may sufficiently biodegrade over time and leave a minimal environmental impact.

In one embodiment, additional additives may include flame retardants, ultra-violet (UV) inhibitors, impact modifiers, and the like. The flame retardants may include compounds that can inhibit, suppress, or delay combustion in the plastic. The flame retardants may include mineral compounds, such as aluminum and magnesium hydroxide, brominated flame retardants, phosphate-ester compounds, and the like.

The UV inhibitor may help to prevent fading or degradation for a limited amount of time. For example, the UV inhibitor may be formulated to prevent degradation over the estimated life span of the luminaire 100. This may be to prevent the bioplastic base 102 from beginning to biodegrade immediately after being fabricated. Thus, the UV inhibitor may be active for 5-10 years to prevent degradation of the bioplastic base 102 and then deactivate to allow the bioplastic base 102 to degrade over time. Examples of UV inhibitors may include benzotriazoles, benzophenones, and other organic compounds.

The impact modifiers may include resins that can be cured to provide additional strength and structural integrity for the bioplastic base 102. For example, the resins may be added to the biodegradable plastic to improve structural characteristics of the housing. The resin may also be added to provide a desired color or opaqueness to the bioplastic base 102.

In one embodiment, the lens 104 may also be fabricated from a bioplastic. For example, the bioplastic base 102 may be clear and may be formed as an optic to redirect or collimate light emitted by the LEDs 110. In one embodiment, the lens 104 may include optical features to redirect light emitted by the LEDs 110 in a desired direction, in a desired angle, in a desired beam spread, and the like.

As noted above, the luminaire 100 may be designed for different commercial or residential applications. The luminaire 100 may include any number of LEDs 110 or arrays of LEDs 110 to generate a desired amount of light output or lumens of light.

Figure 2:
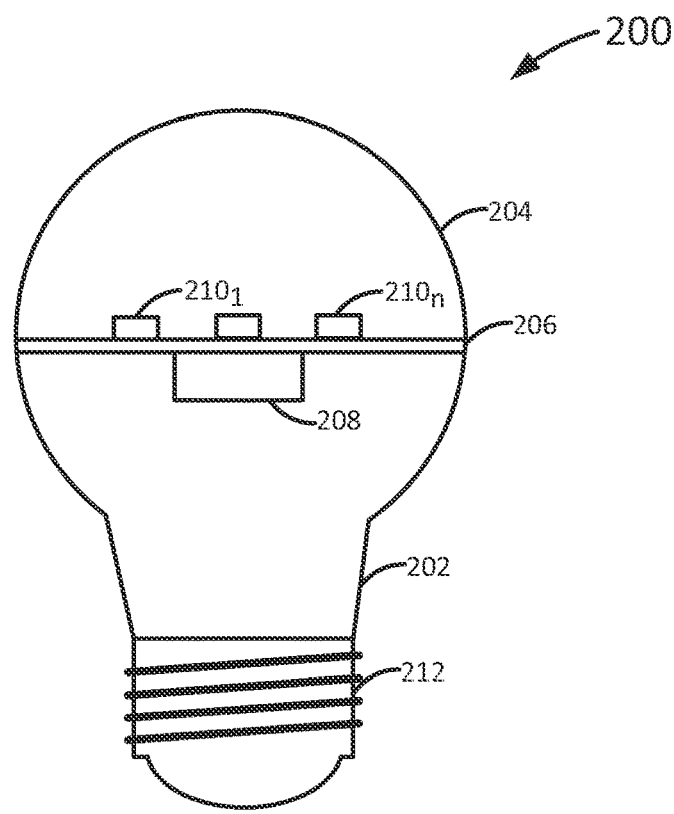
FIG. 2 depicts an example of an Edison screw base luminaire with a bioplastic base of the present disclosure.

FIG. 2 illustrates an example luminaire 200 that can be used for residential applications. In one embodiment, the luminaire 200 may include a bioplastic base 202 and an outer lens or optic 204. The bioplastic base 202 may receive a substrate 206 that includes a driver 208 and one or more LEDs 2101 to 210$n$ (hereinafter also referred to individually as an LED 210 or collectively as LEDs 210).

As illustrated in FIG. 2, the driver 208 may be located on a first side of the substrate 206, and the LEDs 210 may be located on a second side of the substrate 206. In other words, the driver 208 and the LEDs 210 may be located on opposite sides of the substrate 206. However, it should be noted that the driver 208 and the LEDs 210 could be located on the same side of the substrate 206.

In one embodiment, the substrate 206 may be a printed circuit board (PCB). The substrate 206 may include metallic contacts and circuit lines to electrically connect the LEDs 210 to the driver 208, as well as other electrical components within the luminaire 200.

The bioplastic base 202 and the lens 204 may enclose the substrate 206, the driver 208, and the LEDs 210, as well as additional components that are not shown. For example, the bioplastic base 202 and the lens 204 may enclose a power supply, reflectors, heat sinks, wireless transmitter/receivers, other electrical components, and the like.

In one embodiment, the luminaire 200 may include an Edison screw base 212. The Edison screw base 212 may be a threaded base that allows the luminaire 200 to be installed for residential applications or light receptacles. Thus, the bioplastic base 202 may minimize the environmental impact of the thousands of residential light bulbs that are used and disposed of yearly. For example, the bioplastic base 202 may be fabricated without fossil fuels and may naturally degrade over time after the luminaire 200 is disposed of.

In one embodiment, the bioplastic base 202 may be fabricated from a non-biodegradable plastic or a biodegradable plastic. For example, the bioplastic base 202 may be fabricated from a material that can reduce the environmental footprint or impact.

The bioplastic may be modified to provide sufficient structural integrity and/or strength to support the weight of the components received by the bioplastic base 202. The bioplastic may also be modified to withstand some environmental conditions to protect the internal components (e.g., protect against wind, water, dust, and the like) and to withstand relatively high temperatures caused by heat generated by the LEDs.

In one embodiment, the bioplastic may be fabricated from reclaimed content, waste content, or renewable content. In one embodiment, renewable content may include bioplastics made with food crops or plants such as corn or sugar cane. In one embodiment, waste content may include bioplastics made with used or end of life materials like cooking oil. In one embodiment, recycled content may include bioplastics that are made with polymer materials that are obtained from either mechanical shredded or chemical recycling.

In one embodiment, the bioplastic may include at least one of: cellulose based bioplastics (e.g., cellulose acetate), polylactic acid, polyhydroxyalkanoates, thermoplastic starches, and the like. Said another way, the biodegradable plastic may exclude fossil based plastics such as polyvinyl chloride, polyethylene, polyvinyl acetate, and the like. Moreover, the biodegradable plastic may exclude bioplastics that are not biodegradable.

In one embodiment, the bioplastic base 202 may include a mixture with other additives to help the performance and improve the characteristics of the bioplastic base 202. However, the mixture may include at least 50% or more of a mass of the biodegradable plastic to ensure that the bioplastic base 202 may sufficiently biodegrade over time and leave a minimal environmental impact. As discussed above, the additional additives may include flame retardants, ultra-violet (UV) inhibitors, impact modifiers, and the like.

Figure 3:
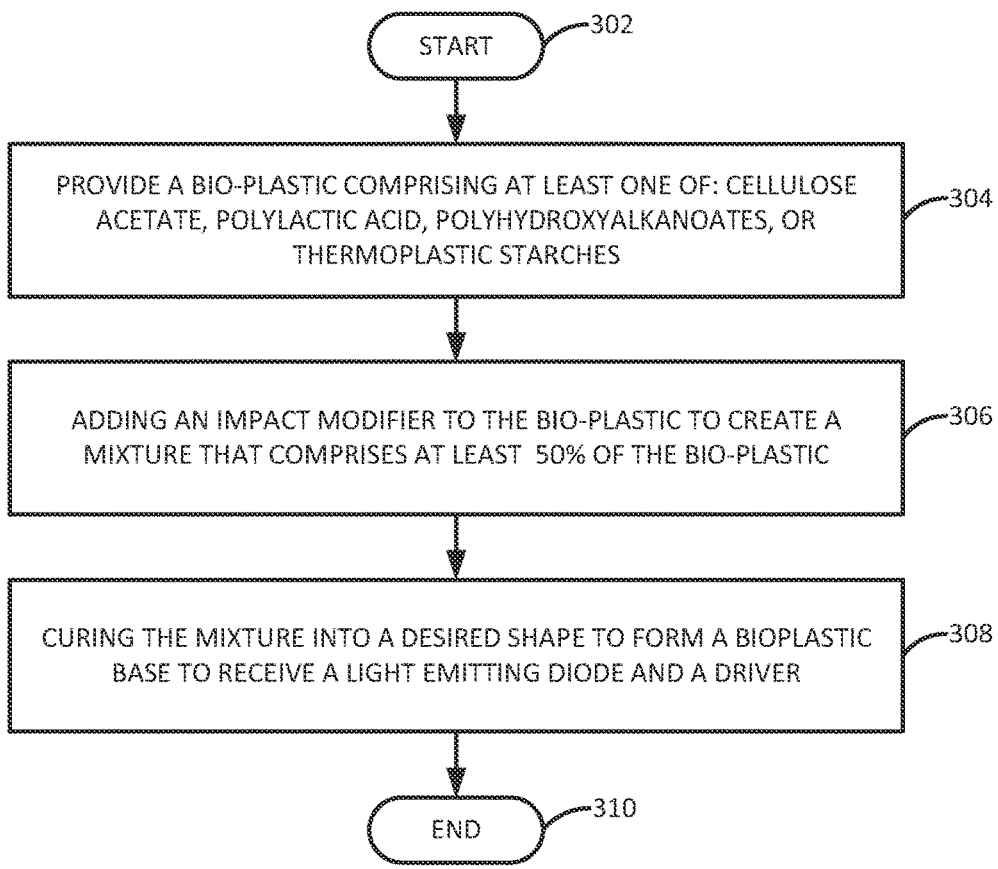
FIG. 3 depicts a flowchart of an example method for forming a luminaire housing.

FIG. 3 illustrates a flowchart of an example method 300 for forming a luminaire housing. The method 300 may begin at block 302. At block 304, the method 300 provides a bioplastic comprising at least one of: cellulose acetate, polylactic acid, polyhydroxyalkanoates, or thermoplastic starches. The bioplastic may be any type of bioplastic that is made without the use of fossil fuels. The bioplastic may be non-biodegradable or may be biodegradable (e.g., can decompose over time by bacteria or other living organisms).

At block 306, the method 300 adds an impact modifier to the bioplastic to create a mixture that comprises at least 50% of a mass of the bioplastic. By having the mixture be greater than 50% of a mass of the bioplastic, the housing can be environmentally friendly. However, the impact modifier may allow the housing to have sufficient strength to support the weight of the internal components, to withstand heat generated by the LEDS of the luminaire, and to withstand certain environmental conditions.

In one embodiment, additional additives can be added to the mixture to improve the overall characteristics of the bioplastic housing. In one embodiment, the additional additives may include flame retardants, ultra-violet (UV) inhibitors, and the like. The flame retardants may include compounds that can inhibit, suppress, or delay combustion in the plastic. The flame retardants may include mineral compounds, such as aluminum and magnesium hydroxide, brominated flame retardants, phosphate-ester compounds, and the like.

The UV inhibitor may help to prevent fading or degradation for a limited amount of time. For example, the UV inhibitor may be formulated to prevent degradation over the estimated life span of the luminaire. This may be to prevent the housing from beginning to biodegrade immediately after being fabricated. Thus, the UV inhibitor may be active for 5-10 years to prevent degradation of the housing and then deactivate to allow the housing to degrade over time. Examples of UV inhibitors may include benzotriazoles, benzophenones, and other organic compounds.

At block 308, the method 300 cures the mixture into a desired shape to form a bioplastic base to receive a light emitting diode and a driver. For example, the impact modifier may be a resin that can be cured to provide additional structural integrity and desired characteristics for the bioplastic housing or luminaire housing. Desired features can be molded into the bioplastic base to receive the LED and the driver, as well as other internal electrical components. At block 310, the method 300 ends.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A housing for a luminaire, comprising:
  a bioplastic base formed to receive a light emitting diode and a driver, wherein the bioplastic base is biodegradable, wherein the bioplastic base is formulated as a mixture of a non-fossil based biodegradable bioplastic, a flame retardant additive, an ultra violet inhibitor, and an impact modifier, wherein the non-fossil based biodegradable bioplastic comprises a biodegradable plastic made without using fossil fuels, wherein the non-fossil based biodegradable bioplastic comprises more than 50% of a mass of the mixture; and
  a lens coupled to the bioplastic base.

2. The housing of claim 1, wherein the lens comprises a bioplastic.

3. The housing of claim 1, wherein the flame retardant additive comprises at least one of: a combination of aluminum and magnesium hydroxide, brominated flame retardants, or phosphate ester compounds.

4. The housing of claim 1, wherein the ultra violet inhibitor comprises at least one of: benzotriazoles or benzophenones.

5. The housing of claim 1, wherein the impact modifier comprises a resin mixed with the bioplastic base.

6. The housing of claim 1, wherein the non-fossil based biodegradable bioplastic comprises at least one of: polylactic acid, polyhydroxyalkanoates, or thermoplastic starches.

7. A luminaire, comprising:
  at least one light emitting diode (LED);
  a driver to power the at least one LED;
  a bioplastic base to receive the at least one LED and the driver, wherein the bioplastic base is formulated as a mixture of a non-fossil based biodegradable bioplastic, a flame retardant additive, an ultra violet inhibitor, and an impact modifier, wherein the non-fossil based biodegradable bioplastic comprises a biodegradable plastic made without using fossil fuels, wherein the non-fossil based biodegradable bioplastic comprises more than 50% of a mass of the mixture; and
  a lens coupled to the bioplastic base such that the at least one LED and the driver are enclosed by the bioplastic base and the lens.

8. The luminaire of claim 7, further comprising:
  an Edison screw base coupled to the bioplastic base.

9. The luminaire of claim 7, wherein the lens comprises a bioplastic.

10. The luminaire of claim 7, wherein the flame retardant additive comprises at least one of: a combination of aluminum and magnesium hydroxide, brominated flame retardants, or phosphate ester compounds.

11. The luminaire of claim 7, wherein the ultra violet inhibitor comprises at least one of: benzotriazoles or benzophenones.

12. The luminaire of claim 7, wherein the impact modifier comprises a resin mixed with the bioplastic base.

13. The luminaire of claim 7, wherein the non-fossil based biodegradable bioplastic comprises at least one of: polylactic acid, polyhydroxyalkanoates, or thermoplastic starches.

14. A method for forming a luminaire housing, comprising:
  providing a non-fossil based biodegradable bioplastic, wherein the non-fossil based biodegradable bioplastic comprises a biodegradable plastic made without using fossil fuels comprising at least one of: polylactic acid, polyhydroxyalkanoates, or thermoplastic starches;
  adding a flame retardant additive, an ultra violet inhibitor, and an impact modifier to the non-fossil based biodegradable bioplastic to create a mixture that comprises at least 50% of a mass of the bioplastic; and
  curing the mixture into a desired shape to form a bioplastic base to receive a light emitting diode and a driver.

* * * * *